Feb. 23, 1971  M. ACKERMAN  3,564,729
MEDICAL TRAINING DEVICE
Filed June 28, 1968

INVENTOR.
MORRIS ACKERMAN
BY
William Grobman

United States Patent Office 3,564,729
Patented Feb. 23, 1971

3,564,729
MEDICAL TRAINING DEVICE
Morris Ackerman, Chevy Chase, Md., assignor to Singer-General Precision, Inc., Binghamton, N.Y., a corporation of Delaware
Filed June 28, 1968, Ser. No. 741,013
Int. Cl. G09b 23/28
U.S. Cl. 35—17                                              4 Claims

ABSTRACT OF THE DISCLOSURE

Medical training methods have changed somewhat over the years but, in total, probably less than training in most other fields. Although the medical practitioner has at his disposal new and better electronic aids for both diagnosis and treatment, little has been developed in the way of electronic training devices. This invention provides one means for improving medical training. A mannequin, as lifelike as possible, is equipped with electronic transducers for simulating the noises usually heard in the thorax. Provisions are made for duplicating the sounds of the heart, of breathing, of the pulse, even of coughing when desired. Each of these sounds has several conditions. For example, the heartbeat is that of a normal person with the further selective modification to that of an abnormal heart. Other abnormal sounds can be duplicated at will. This invention further contemplates the modification of the sounds under the control of a computer so that a program of training can be established and automatically followed.

---

This invention relates to training devices and, more particularly, to devices for simulating the sounds of healthy persons to be used for medical training.

Mannequins for use in training medical students have been used before. In most cases, each mannequin is constructed to demonstrate but a single function or problem. For examples, the prior art includes dolls which display rashes, dolls which are heated to indicate fevers, mannequins to illustrate wounds, and mannequins to illustrate the manner in which portions of the body (such as joints) are constructed. None of these prior art devices can be considered a general medical training device.

One of the most important criteria for diagnosing a patient's problems is the sounds that the body produces. Yet, there are no devices on the market for training medical students in these sounds, or in their general location. In some cases, such as asthmatic attacks, the sounds of the respiration and also of the heartbeat change. The two changes must be correlated in a training device to produce proper training. To accomplish this, the sounds must be electronically generated, not reproduced recordings, and the changes must be controlled by a central device. This invention includes a computer for this purpose.

It is an object of this invention to provide a new and improved training system.

It is another object of this invention to provide a new and improved system for training medical students.

It is a further object of this invention to provide a new and improved electronic training device for simulating the functioning and the malfunctioning of various vital activities of the human body.

Other objects and advantages of this invention will become more apparent as the following description proceeds, which description should be considered together with the accompanying drawing, in which.

Figure 1:
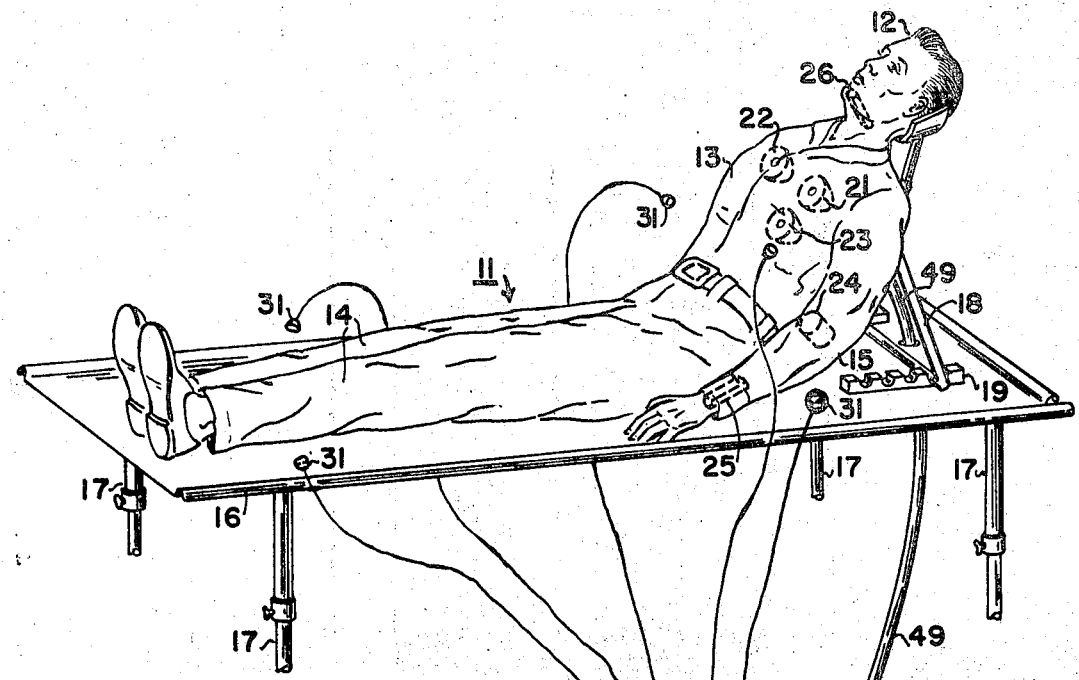
FIG. 1 is a block and pictorial view of the apparatus of this invention.

Referring now to the drawing in detail, the reference character 11 designates a mannequin which may be made as lifelike as possible. The mannequin 11 includes a head 12, a torso 13 and legs 14. The mannequin 11 is supported in a generally prone position on a stretcher or table 16 which is supported on legs 17. On the table 16 is a hinged support 18 for the upper portion of the body 11 to raise the head 12 and the torso 13 above the table level for greater ease of inspection. Blocks 19 provide a plurality of positions for adjusting the support 18 in any of a number of positions. Mounted in the torso 13 are a plurality of transducers for producing appropriate sounds. A pair of speakers or other suitable sound transducers 21 and 22 are located in the upper chest to reproduce the sounds of breathing, while a similar speaker or other transducer 23 is located in the left chest below the speaker 21 to reproduce the sounds of the heartbeat. Shown in the left arm are a pressure transducer 24 mounted in the inside of the elbow to produce pressures similar to that of the circulatory system, and in the wrist is mounted a pulsing transducer 25 which duplicates the pulse. A speaker may also be located in the throat or mouth in those systems which may also wish to produce words of the simulated patient in response to a question. In addition, a resistor or heater 26 is located in the mouth to determine a patient's temperature. The pulse and pressure transducers 24 and 25 may be duplicated in the right arm also.

The transducers 21-26 which are mounted in the mannequin 11 are connected with external equipment by means of a cable 49. The cable 49 contains a plurality of individual wires—as many as required to operate the apparatus—and the individual wires of the cable 49 may be formed as an integral part of the mannequin 11. The external equipment includes a digital computer 41, having connected to its input an instructor's station 42. The outputs of the digital computer are connected to a plurality of individual devices, each of which operates to control a particular transducer in the mannequin 11. One output from the digital computer 41 is applied to a heart sound generator 45, another one to a breath or respiratory sound generator 46, a third to a temperature control 47, and another to a blood pressure control system 48. The outputs of these individual systems are wires which are included in the cable 49. Under ordinary circumstances, the computer 41 controls each of the generators 45–48 so that they would generate signals representative of normal physiological operations. This means that normally the heart sound generator 45 will generate electrical signals which, when applied to the transducer 23, would produce the sound of a normal heartbeat. This could be monitored by use of a standard stethoscope and can be used to train a student in identifying a normal heartbeat. The same is true of the breath sound generator 46 which generates electrical signals normally representing normal respiratory sounds in the chest cavity. The use of a stethoscope to monitor these sounds is normal procedure and they can be used to train the recognition of normal breathing. Similarly, the temperature control device 47 will transmit sufficient electricity to resistance element 26 contained within the mannequin 11 to maintain a normal body temperature of 98.6°. Similarly, the transducer 24 would be energized from the blood pressure control 48 with a signal sufficiently strong to produce the desired effects when the blood pressure of the mannequin 11 is taken using normal blood pressure equipment. Although not shown in FIG. 1, the computer outputs could also include a pulse device which would determine the pulse rate generated by the transducer 25 and other similar devices.

As mentioned above, the computer 41 normally operates to control each of its output devices 45–48 so that normal and natural characteristics are demonstrated by the mannequin 11. However, each system is capable of modifying its operation to demonstrate malfunctions, so that with a programmed training schedule, the computer can control the output of one or more of the control devices 45–48 to introduce an abnormality into that particular function. For example, in the early stages of medical training, all of the functions could be operated normally. Then a single abnormality can be introduced into the sound of the heart beating by means of the controls 45. The transducer 23 would reproduce the electrical signals applied to it from the heart sound generator 45 so that a student listening with a stethoscope would detect a too rapid beat, a weak beat, a murmur, or other abnormalities. By repeated listening the student would learn to identify each of these sounds and associate them correctly with an abnormality. Subsequently, the heart sound generator 45 would again produce a normal sound pattern and an abnormality could, for example, be introduced into the respiration by appropriate control of the breath sound generator 46. Thus, a student can be taught one abnormality at a time, and when he has learned to correctly identify each abnormality as it exists by itself, combinations thereof can be introduced in order to simulate a patient with a particular ailment. For example, there should be correlation among the sound of the heart, the pulse rate, and the blood pressure. In the system of this invention, these can be correlated by the computer 41 which would control each of the individual control systems separately. In addition, an instructor at the instructor's station 42 could introduce, through the computer 41, abnormalities at will. The instructor's station could be used not only for individual or specified teaching, but for test purposes as well, by modifying the operation of the computer 41 so that the operations of the various control devices are no longer properly correlated. The ability of the student to recognize inconsistencies could thus be tested.

There are several ways in which the normal conditions generated by the generators 45–48 can be modified to duplicate abnormal conditions. For examples, the heart sound generator 45 can be constructed to generate the waveforms of a normal heart beat. When desired, the circuit of the generator itself can be modified by the modification of circuit parameters to change the output waveforms. Or, the circuit of the generator 45 can be left untouched and a second generator which generates the desired abnormal waveforms can be substituted when such a waveform is desired. A third possibility is to modulate the output of the generator 45 with another signal to produce a composite waveform which represents the abnormal operation. In any case, the operation is under the control of the computer 41 either automatically or upon order from the instructor's station 42. The system of FIG. 1 is a simplified showing of what could be a very complex system, the complexity of which depended upon the means for developing abnormal waveforms and the numbers of such waveforms desired, but control circuits are shown at 55, 56, 57 and 58. The above discussion used the heart sound generator 45 as an example, but it must be realized that the same can be applied to each of the generators.

In addition, electrocardiogram apparatus shown at 44 could be used in conjunction with the other equipment. The computer 41 would control on one of its outputs an EKG control device 43, which would, in turn, control the operation of the electrocardiogram 44. Appropriate electrodes or probes 31 would be provided. In order to provide a workable training system, the correct operation of all of the individual components must be correlated by the computer 41. If a heart ailment is introduced into the system by the control device 45, the electrocardiogram device 44 must show the appropriate curves.

Figure 2:
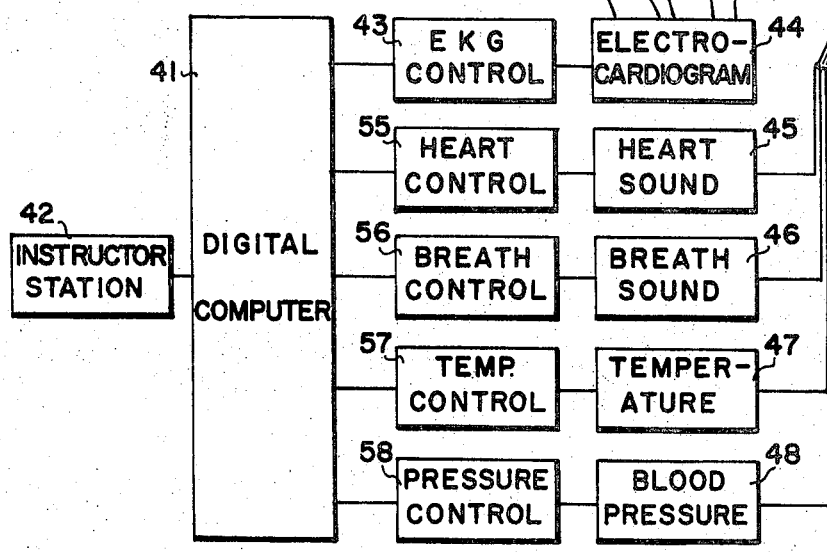
FIG. 2 is a section view of a pressure transducer as used in the invention of FIG. 1.
Figure 2:
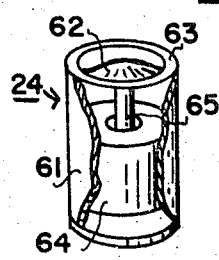

FIG. 2 shows one form of device which could be used to simulate both blood pressure and pulse beat. The transducer 24 shown in FIG. 2 comprises a generally hollow cylindrical housing having at one end a rim 63 and a flexible diaphragm 62 held in place by the rim 63. Within the housing 61 is a solenoid coil 64 having a core 65. One end of the core 65 presses against the diaphragm 62. The assembly could include a spring to oppose the movements of the core 65 when the coil 64 is energized, or the coil 64 could be a split coil having currents flowing through it in opposite directions to provide a differential effect upon the core 65. In either case, the signals applied to the coil 64 from its appropriate control system cause the core 65 to press against the diaphragm 62 in pulses to produce a simulated pulse. The greater the amount of pressure exerted by the core 65, the greater the simulated blood pressure.

As shown in FIG. 1, the mannequin 11 has its upper portion propped up by an adjustable hinge support 18. This is a matter of convenience and the mannequin 11 can be arranged flat on the table 16. As shown, the legs 17 are telescoping so that the height of the table 16 can be readily adjusted to meet the needs of the individual student. However, refinements such as these are not normally considered part of the invention and may be introduced to render the overall apparatus more efficient.

The above specification has described a new and improved general means for training medical students. This training device includes means for simulating actual physiological phenomena, both normal and abnormal, so that a student can be introduced first to a normal situation and then to an abnormal one. Since the entire system is under the control of a computer, a student can be moved along in training at a speed which is best for him, and his training need not be wholly dependent upon the availability of patients. It is realized that the above description may indicate to others skilled in the art additional ways in which the principles of this invention may be used without departing from its spirit. It is, therefore, intended that this invention be limited only by the scope of the appended claims.

What is claimed is:

1. A training device for simulating animal body conditions, said device comprising a structure visually duplicating the animal body being simulated, sound transducers contained within said structure, generating means for generating waveforms of sounds normally produced in the animal body being simulated, means for applying the outputs from said generating means to individual transducers to reproduce at appropriate locations in the animal body being simulated sounds normally occurring therein, and means for selectively modifying said normal waveforms to produce waveforms of abnormal sounds which occur in the animal body being simulated.

2. The training device defined in claim 2 further including a central control apparatus for automatically controlling the operation of the individual modifying means to coordinate the generation of several abnormal waveforms in appropriate timing to simulate symptoms of medical illnesses.

3. The device defined in claim 2 further including means for manually controlling the operation of individual modifying means, said manual control means being connected to said central control means to modify its automatic operation.

4. Apparatus for training medical students; said apparatus comprising a mannequin; sound transducers appropriately positioned in said mannequin at the locations of body sounds such as heart beat, breathing, and pulse; means for generating waveforms of a plurality of normal body sounds; means for connecting the outputs of the generating means to the individual transducers to reproduce the waveforms in sound form; means for modifying said waveforms to produce waveforms of abnormal sounds which occur in the body; automatic programming means for controlling the operation of said generating and modifying means in appropriate timing to simulate the symptoms of well and ill persons; and an instructor station for selectively overriding the automatic operation of said programming means.

References Cited
UNITED STATES PATENTS 3,027,655  4/1962  Alderson _____ 35—17

OTHER REFERENCES

Readers' Digest, July 1967, p. 200 only.
Washington Post, Mar. 18, 1967, p. A6 only.

HARLAND S. SKOGQUIST, Primary Examiner